May 12, 1964  W. M. GREENSLATE  3,132,755
CAMP TABLE AND LOADING ASSISTING PANEL FOR VEHICLES
Filed Feb. 14, 1961  3 Sheets-Sheet 1

Wesley M. Greenslate
INVENTOR.

BY

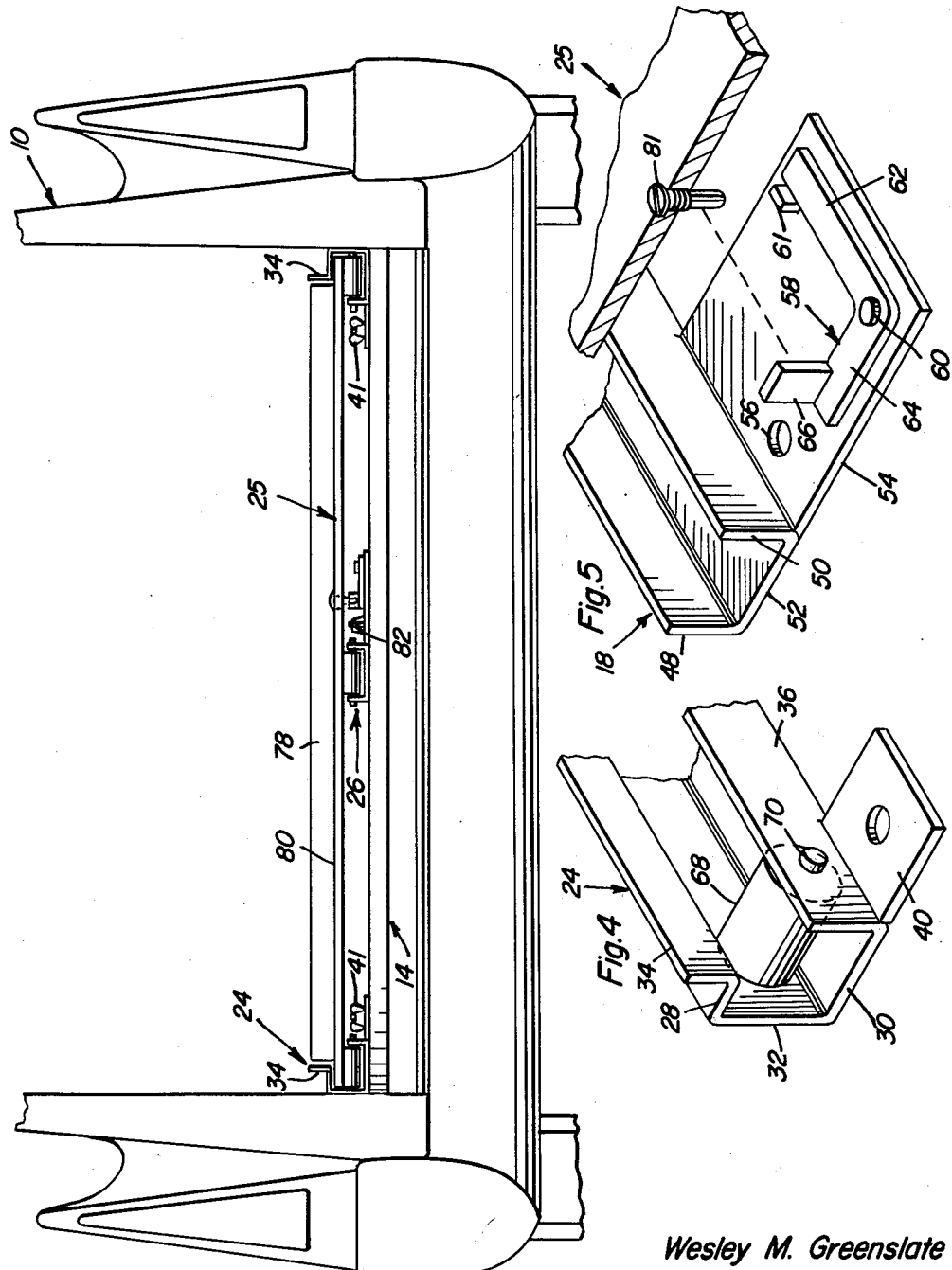

May 12, 1964         W. M. GREENSLATE         3,132,755
CAMP TABLE AND LOADING ASSISTING PANEL FOR VEHICLES
Filed Feb. 14, 1961                              3 Sheets-Sheet 3
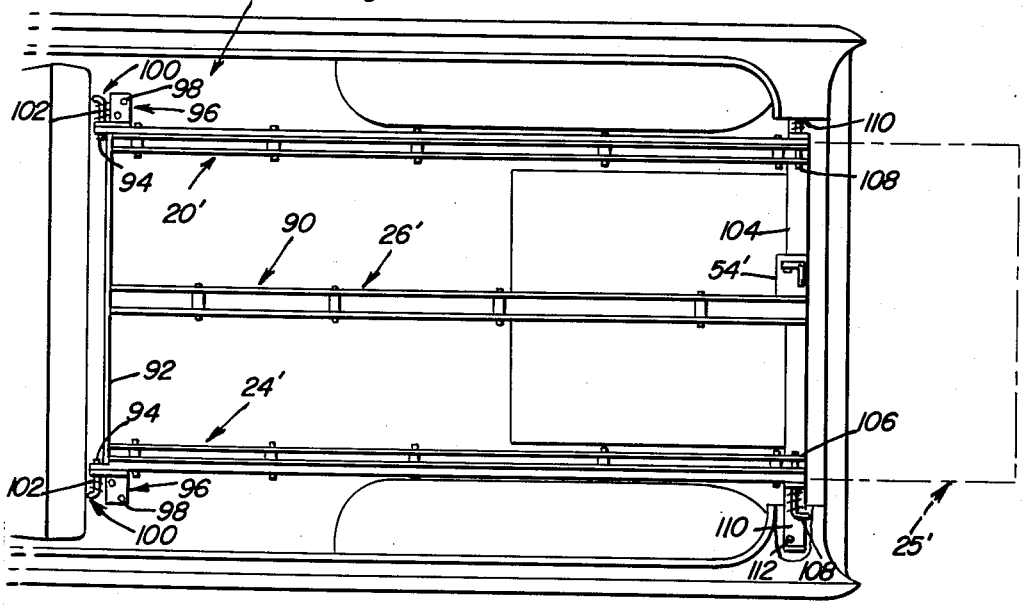
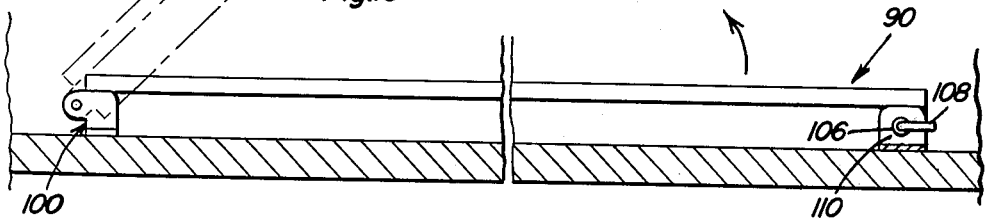
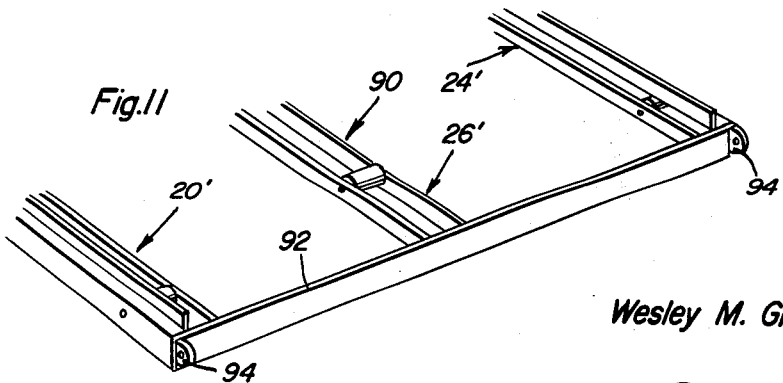
Wesley M. Greenslate
INVENTOR.

United States Patent Office 3,132,755
Patented May 12, 1964

3,132,755
CAMP TABLE AND LOADING ASSISTING
PANEL FOR VEHICLES
Wesley M. Greenslate, Sutter Creek, Calif.
(P.O. Box 40, Martell, Calif.)
Filed Feb. 14, 1961, Ser. No. 89,311
7 Claims. (Cl. 214—83.24)

This invention relates to a novel and useful camp table and loading assisting panel for vehicles and more particularly to a loading and unloading assisting panel for vehicles provided with load beds. Although the loading and unloading assisting panel may also be conveniently used in connection with pick up trucks, panel trucks, etc., it is primarily designed for use with station wagon type vehicles. Most station wagon type vehicles are provided with tailgates which are pivotally mounted at their lower edges of movement about an axis extending transversely of the vehicle. When the tailgate of a station wagon is lowered in order to enable the load bed of the station wagon to be loaded from the rear, the tailgate projects considerably beyond the rear end of the station wagon and makes it difficult to position heavy objects on the load bed thereof. It is quite often necessary to first place a heavy object on the tailgate of the station wagon and then slide the heavy object forwardly until it is positioned on the load bed and the tailgate may be closed. Additionally, some types of station wagons are provided with only two doors and thus it is extremely difficult to obtain access to the forward end of the load bed of these types of station wagons.

A main object of this invention is to provide a device for assisting the loading and unloading of station wagons, which device comprises a horizontally disposed panel unit or assembly including a movable load supporting panel which may be readily moved longitudinally of the unit to project outwardly beyond the rear end of the station wagon in which the unit is disposed. The loading and unloading assisting unit is provided with anti-friction support means for the movable panel and also with lock means whereby the panel may be locked in position relative to the unit so as to prevent the shifting of the panel relative to the unit when a load is being supported by the former.

A further object of this invention, in accordance with the preceding object is to provide a loading and unloading assisting paneling unit which may be readily secured in a station wagon on the load bed thereof in a manner whereby the unit may be removed when it is desired to do so.

Still another object of this invention, in accordance with the preceding objects, is to provide a unit adapted to be secured to the bed of a station wagon at the forward end of the unit in a manner whereby the unit may be pivoted about an axis extending transversely of the unit and the vehicle in which it is disposed immediately adjacent the forward end of the unit. In this manner, the rear end of the unit may be raised in order to afford access to the spare tire well which is positioned in some station wagon type vehicles beneath the load bed immediately adjacent the rear end thereof. By providing a means whereby the forward end of the unit may be pivotally secured to the load bed of a station wagon, if it becomes necessary to gain access to the spare tire, it is merely necessary to raise the rear end of the unit a sufficient distance in order to remove the spare tire from the well in which it is normally disposed.

Still another object of this invention in accordance with the immediately preceding object, is to provide means for releasably securing the rear end of the unit to a station wagon load bed in a manner whereby the rear end of the unit may be quickly and easily detached from the load bed.

Another object of this invention is to provide supporting and guide means for the movable panel which will enable a considerable load to be placed on the rear end of the panel when the latter is disposed with the rear end thereof projecting beyond the rear end of the station wagon in which it is disposed.

A final object to be specifically enumerated herein is to provide a loading and unloading assisting panel unit which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary enlarged rear elevational view of the station wagon shown with the loading and unloading assisting panel units mounted therein;

FIGURE 4 is a fragmentary enlarged perspective view of a portion of one of the longitudinally extending channel defining members utilized to mount the movable panel for sliding longitudinal movement in a station wagon;

FIGURE 5 is a fragmentary enlarged perspective view of the center elongated longitudinally extending support member for the movable panel, portions of the movable panel being broken away and shown in section;

FIGURES 9 is a fragmentary top plan view similar to that of FIGURE 2 but showing a modified form of loading and unloading assisting panel unit;

FIGURE 10 is a fragmentary enlarged vertical sectional view of the embodiment illustrated in FIGURE 9 and showing an alternate position of the loading and unloading assisting panel units in phantom lines; and FIGURE 11 is a fragmentary perspective view of the panel supporting and guide assembly utilized in the modified form of the invention illustrated in FIGURES 9 and 10.

Figure 1:
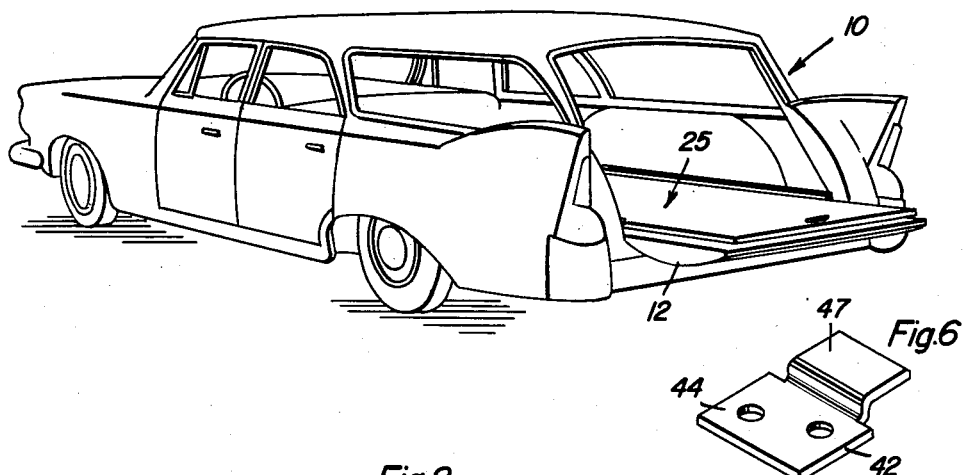
FIGURE 1 is a perspective view of a conventional type of station wagon shown with the loading and unloading assisting panel unit of the instant invention mounted therein.

Referring now more specifically to the drawings, the numeral 10 generally designates a conventional type of station wagon which includes a tail gate assembly 12 pivotally secured at its lower end for movement about an axis extending transversely of the station wagon 10 whereby the tailgate 12 may be pivoted from an upstanding position closing the rear end of the station wagon 10 to the open position illustrated in FIGURE 1.

The station wagon 10 also includes a load bed generally referred to by the reference numeral 14. The loading and unloading assisting panel unit of the instant invention is generally referred to by the reference numeral 16 and includes an elongated panel supporting and guide assembly generally referred to by the reference numeral 18. The supporting and guide assembly includes a pair of elongated longitudinally extending parallel channel members generally referred to by reference numerals 20 and 24 which define two elongated longitudinally extending parallel channels opening toward each other. A load panel generally referred to by reference numeral 25 is slidably engaged with the channel members 20 and 24 for movement longitudinally of the unit 18.

The unit 18 also includes a center longitudinally extending support member generally referred to by the reference numeral 26.

Figure 6:
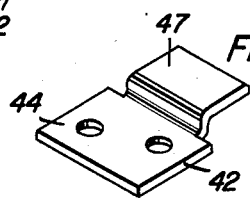
FIGURE 6 is a perspective view of one of the clamps utilized to secure the forward end of one of the longitudinal members of the supporting and guide assembly to a station load bed.
Figure 2:
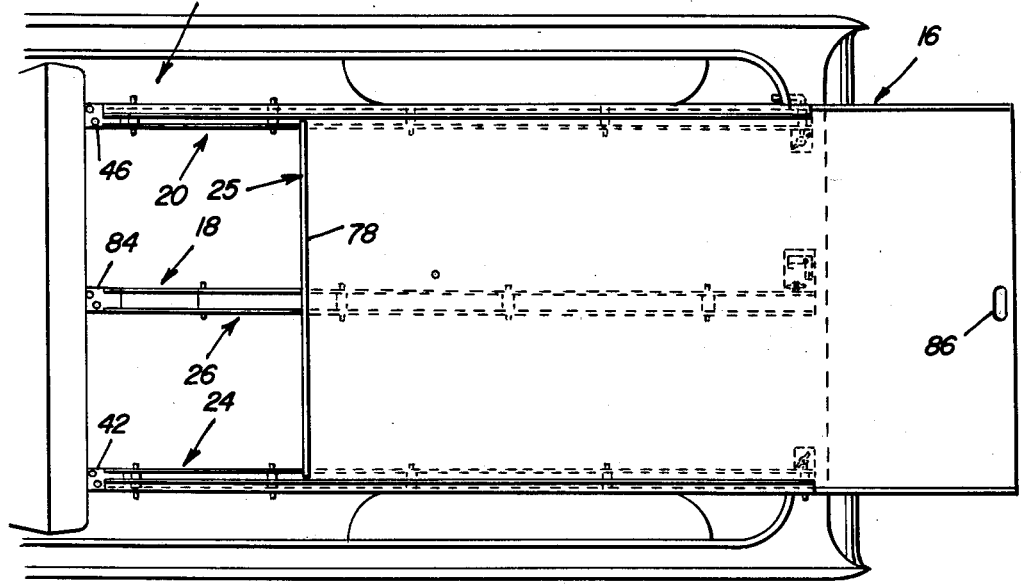
FIGURE 2 is a fragmentary top plan view of the rear end of a station wagon shown with the panel unit of the instant invention disposed therein, the movable panel of the unit being positioned slightly rearwardly of the support and guide means by which it is secured in the station wagon and parts of the station wagon being broken away.

Each of the channel members 20 and 24 is horizontally disposed and includes a pair of generally parallel horizontal legs 28 and 30 interconnected by means of a bight portion 32. The free end of each leg 28 terminates in an upstanding longitudinally extending rail portion 34 and the free ends of the legs 30 each terminate in upstanding support flanges 36 opposing the bight portion 32. Each channel member also includes an apertured mounting flange 40 by which the rear end thereof may be secured to the load bed 14 in any convenient manner such as by fasteners 41. Each of the forward ends of the channel members 20 and 24 is removably secured to the load bed 14 by means of a clamp plate 42, see FIGURES 2 and 6, which includes an apertured base portion 44 that may be secured to the load bed 14 in any convenient manner such as by fasteners 46 and an offset clamping flange 47 under which the forward end of the corresponding leg 30 is disposed in order to secure the corresponding channel member to the load bed 14.

The support member 26 is generally U-shaped in configuration and includes a pair of generally parallel legs 48 and 50 interconnected at their lower ends by means of a bight portion 52. The support member 26 also include a mounting flange which is referred to by the reference numeral 54.

The mounting flange 54 is suitably apertured as at 56 and has a bell crank generally referred to by reference numberal 58 pivotally mounted thereon by means of pivot pin 60. The mounting flange 54 includes an upstanding stop 61 against which the free end of one leg 62 of the bell crank 58 may abut. The free end of the other leg 64 of the bell crank is provided with an upstanding stop flange 66 for a purpose to be hereinafter more fully set forth.

Figure 7:
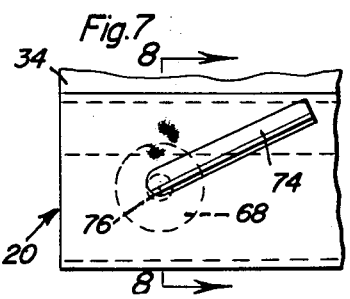
FIGURE 7 is a fragmentary enlarged side elevational view of the rear end of one of the elongated channel defining members showing the manner in which one of the rollers journaled therein may be raised relative to the opposing guide flange.
Figure 8:
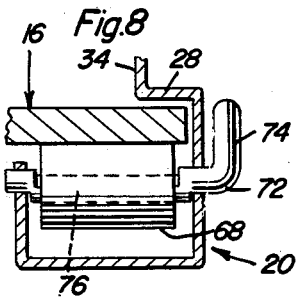
FIGURE 8 is a fragmentary vertical sectional view taken substantially upon the plane indicated by section line 8—8 of FIGURE 7.

It will be noted that each of the channel members 20 and 24 is provided with a plurality of longitudinal spaced rollers 68 some of which are journalled for rotation about axes extending transversely of the corresponding channel member by means of axle ends 70 projecting from the opposite ends of each of the rollers 68 and journalled in the corresponding support flanges and bight portions 32. However, with attention now directed more particularly to FIGURES 7 and 8 of the drawings it will be noted that one of the rollers 68 is rotatably mounted by means of a crankshaft 72 having a crank arm 74. The roller supported by the crankshaft 72 is rotatably journalled on the throw 76 of the crankshaft and it will be noted that by swinging the crankarm 74 the roller supported by the crankshaft 72 may be raised or lowered relative to the leg or opposing flange 28. In this manner, the corresponding longitudinal marginal edge portion of the panel 16 may be clampingly engaged between the roller 68 and supported by the crankshaft 72 and the adjacent portion of the opposing leg or flange 28 in order to secure the panel 16 in adjusted position relative to the unit 18.

The panel 16 is provided with a forward upstanding transversely extending rail portion 78 which terminates a spaced distance above the upper surface 80 of the panel 16. Additionally it will be noted that each of the rail portions 34 also terminate a spaced distance above the upper surface 80 of the panel 16. The rail portions 34 and 78 are provided to prevent shifting of a load being supported by the panel 16.

With attention directed to FIGURE 5 of the drawings, it will be seen that the panel 16 is provided with a stop pin assembly 81 in longitudinal alignment with the stop 66 when the bell crank 58 is positioned as illustrated in FIGURE 5. The stop pin assembly 81 is utilized to prevent rearward longitudinal shifting of the panel 16 beyond a given point. If it is desired to move the panel 16 rearwardly of this point, the panel 16 is first shifted forwardly until the bell crank 58 may be pivoted in a clockwise direction as viewed in FIGURE 5 of the drawings to move the stop 66 out of longitudinal alignment with the stop pin assembly 81 whereupon the panel 16 may then be slid rearwardly as desired. The support member 26 has its rear end removably secured to the load bed 14 by means of a threaded fastener 82 secured through the aperture 56 and the forward end of the support member 26 is secured to the load bed 14 by means of a clamp plate 84 substantially identical to the clamp plates 42. Finally, the panel 16 is provided with a hand-grip opening 86 by which the panel 16 may be grasped and positioned relative to the unit 18 as desired.

With reference now to FIGURES 9 through 11 of the drawings there will be seen a modified form of unit generally referred to by the reference numeral 90. The supporting panel used in connection with the unit 90 is substantially identical to panel 25 and is generally designated by the reference numeral 25'. Additionally, the unit 90 also includes a pair of channel members similar to channel members 20 and 24 which are generally designated by the reference numerals 20' and 24'. However, the forward ends of the channel members 20' and 24' are interconnected by means of a header bar 92 provided with laterally directed and longitudinally extending apertured ears 94 at its opposite ends. The forward end of the unit 90 is secured to the load bed 14' by means of pivot brackets generally referred to by the reference numeral 96 which are secured to the load bed 14' in any convenient manner such as by fasteners 98 and are provided with spring urged pivot pin assemblies generally referred to by the reference numeral 100 which each include a retractable spring urged pin 102 disposed through the corresponding apertured ear 94. The unit 90 also includes a support member substantially identical to the support member 26 but generally designated by the reference numeral 26'. The forward end of the support member 26' is fixedly secured to the header bar 92 in any convenient manner and the rear ends of the channel members 20' and 24' and the rear end of the support member 26' are interconnected by means of a rear header bar 104.

The rear ends of each of the channel members 20' and 24' are provided with a pair of aligned apertures 106 and the rear end of the unit 90 is secured to the load bed 14' by means of a spring urged retaining pin 108 carried by each of the mounting brackets 110 which may be secured to the load bed 14' by means of fasteners 112.

The support member 26' of the unit 90 is provided with a mounting flange 54' similar to mounting flange 54 with the exception that the mounting flange 54' is secured to the rear header bar 104 and the support member 26'.

It will be noted that the rollers of the channel members of each of the units 18 and 90 are in transverse alignment with each other and that the rollers of the corresponding support member are staggered relative to the rollers of the channel members.

In operation, the unit 18 is secured in the wagon 10 in the manner hereinbefore set forth. When it is desired to place a load in the wagon 10 the tailgate 12 thereof is moved to the horizontal position and the panel 25 may be withdrawn partially from the rear end of the wagon 10. The load may then be placed on the withdrawn portion of the panel 25 to thereafter be moved into the interior of the station wagon 10 by returning the panel 25 to its forwardmost position. Then, the roller 68 supported by the crankshaft 72 may be raised to compressively engage the corresponding marginal portion of the panel 25 and the bell crank 58 may be pivoted into the position illustrated in FIGURE 5 of the drawings. The unit 18 may be removed from the wagon 10 by removing the fasteners 41 and 82 after the panel 25 has been completely removed. Then, the channel members 20 and 24 together with the support member 26 may be slid rearwardly of the wagon 10 out of engagement with the clamp plates 42 and 84.

The operation of the unit 90 is substantially the same with the exception being that the unit 90 may be swung upwardly at its rear end by withdrawing the pins 108 from the aligned apertures 106. Additionally, when it is desired to remove the unit 90, the pins 102 and the pins 108 may be withdrawn whereupon the entire unit 90 may be removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A loading and unloading assisting panel unit for vehicle load beds, said unit including a panel supporting and guide assembly comprising a pair of longitudinally extending elongated and parallel channel defining members each opening toward each other and having an upper and lower horizontal flange secured by an upstanding bight portion, a vertically extending flange of less height than the bight portion secured to the forward end of each lower horizontal flange, a plurality of opposing longitudinally spaced rollers journalled for rotation about horizontal axes extending transversely between the bight portion and vertical flange of each channel defining member, the upper limit of said rollers spaced above the upper edge of the vertically extending flange and below the upper horizontal flange, and a planar load panel having its opposite longitudinal side marginal portions slidably received within said channel defining members between the upper horizontal flanges and the corresponding longitudinally spaced rollers for movement on said rollers.

2. The combination of claim 1 wherein said upper horizontal flanges terminate at their forward ends in upstanding side rail portions terminating at their upper edges a spaced distance above the upper surface of said load panel.

3. The combination of claim 1 including a longitudinally extending support member disposed between and parallel to said channel defining members, and a plurality of longitudinally spaced rollers rotatably mounted on said support member parallel to said first mentioned plurality of rollers and freely engageable with the undersurface of the planar load panel.

4. The combination of claim 1 including means interconnecting the inner ends of said elongated channel defining members and pivotally securing said inner ends to the load bed for movement about a horizontal axis extending transversely of said channel defining members.

5. A loading and unloading assisting panel unit for vehicle load beds, said unit including a panel supporting and guide assembly comprising a pair of longitudinally extending elongated and parallel channel defining members each opening toward the other and having an upper and lower horizontal portion secured by an upstanding bight portion, vertically extending support means of less height than the bight portion secured to the forward end of each lower horizontal portion, a plurality of opposing longitudinally spaced rollers journalled for rotation about horizontal axes extending transversely between the bight portion and vertical support means of each channel defining member, the upper limit of said rollers spaced above the upper edge of the vertically extending support means and below the upper horizontal portion, and a planar load panel having its opposite side marginal portions slidably received within said channel defining members between the upper horizontal portions and the corresponding longitudinally spaced rollers for movement on said rollers.

6. A loading and unloading assisting panel unit for vehicle load beds, said unit including a panel supporting and guide assembly comprising a pair of longitudinally extending elongated and parallel channel defining members each opening toward each other and having an upper and lower horizontal flange secured by an upstanding bight portion, a vertically extending flange of less height than the bight portion secured to the forward end of each lower horizontal flange, a plurality of opposing longitudinally spaced rollers journalled for rotation about horizontal axes extending transversely between the bight portion and vertical flange of each channel defining member, the upper limit of said rollers spaced above the upper edge of the vertically extending flange and below the upper horizontal flange, and a planar load panel slidably engaged with said channel defining members and having opposite side marginal portions slidably received between the upper horizontal flanges and the corresponding longitudinally spaced rollers, at least one of said rollers being rotatably mounted on an eccentric shaft having a control arm extending therefrom whereby rotation of the eccentric shaft will effect a raising of said roller and a clamping of the superimposed portion of the load panel between the roller and the adjoining portion of the upper horizontal flange.

7. A loading and unloading assisting panel unit for vehicle load beds, said unit including a panel supporting and guide assembly comprising a pair of longitudinally extending elongated and parallel channel defining members each opening toward the other and having an upper and lower horizontal portion secured by an upstanding bight portion, vertically extending support means of less height than the bight portion secured to the forward end of each lower horizontal portion, a plurality of opposing longitudinally spaced rollers journalled for rotation about horizontal axes extending transversely between the bight portion and vertical support means of each channel defining member, the upper limit of said rollers spaced above the upper edge of the vertically extending support means and below the upper horizontal portion, and a planar load panel having its opposite side marginal portions slidably received within said channel defining members between the upper horizontal portions and the corresponding longitudinally spaced rollers for movement on said rollers, at least one of said rollers being rotatably mounted on an eccentric shaft having a control arm extending therefrom whereby rotation of the eccentric shaft will effect a raising of said roller and a clamping of the panel between the roller and the adjoining upper portion.

References Cited in the file of this patent

UNITED STATES PATENTS

| 1,610,582 | Pegariek | Dec. 14, 1926 |
| 1,784,975 | Rosman | Dec. 16, 1930 |
| 2,091,070 | Girl | Aug. 24, 1937 |
| 3,004,790 | Mayer | Oct. 17, 1961 |

FOREIGN PATENTS

| 125,678 | Switzerland | May 1, 1928 |